United States Patent
I et al.

(10) Patent No.: US 8,341,937 B2
(45) Date of Patent: Jan. 1, 2013

(54) DIAGNOSTIC APPARATUS FOR AN EXHAUST GAS PURIFICATION SYSTEM OF AN INTERNAL COMBUSTION ENGINE, AN EXHAUST GAS PURIFICATION SYSTEM AND A DIAGNOSTIC METHOD THEREOF

(75) Inventors: Sunki I, Seoul (KR); Kenichi Sato, Yokohama (JP); Motoharu Akaba, Yokohama (JP); Kimiyoshi Nishizawa, Yokohama (JP); Kengo Kubo, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 1389 days.

(21) Appl. No.: 11/717,784

(22) Filed: Mar. 14, 2007

(65) Prior Publication Data
US 2007/0214775 A1    Sep. 20, 2007

(30) Foreign Application Priority Data

Mar. 15, 2006  (JP) ................................. 2006-070232
Mar. 16, 2006  (JP) ................................. 2006-072001
Mar. 16, 2006  (JP) ................................. 2006-072004

(51) Int. Cl.
*F01N 3/00* (2006.01)
(52) U.S. Cl. ................ 60/277; 60/285; 60/287; 60/288; 60/324
(58) Field of Classification Search .................... 60/274, 60/276, 277, 287, 288, 324, 285
See application file for complete search history.

(56) References Cited

U.S. PATENT DOCUMENTS

| | | | | |
|---|---|---|---|---|
| 5,522,219 A * | 6/1996 | Orzel et al. | ...................... | 60/274 |
| 5,761,902 A * | 6/1998 | Usami et al. | ..................... | 60/288 |
| 6,003,309 A * | 12/1999 | Agustin et al. | ................... | 60/276 |
| 6,321,533 B1 * | 11/2001 | Watanabe et al. | ............... | 60/324 |
| 6,334,304 B1 * | 1/2002 | Machida et al. | ................ | 60/274 |
| 6,477,830 B2 * | 11/2002 | Takakura et al. | ............... | 60/277 |

FOREIGN PATENT DOCUMENTS

| | | |
|---|---|---|
| JP | 05-321644 | 12/1993 |
| JP | 07-119446 | 5/1995 |
| JP | 09-016253 | 1/1997 |
| JP | 09-072211 | 3/1997 |
| JP | 09-088562 | 3/1997 |
| JP | 09-209744 | 8/1997 |
| JP | 2005-188374 | 7/2005 |

\* cited by examiner

*Primary Examiner* — Thomas Denion
*Assistant Examiner* — Diem Tran
(74) *Attorney, Agent, or Firm* — Drinker Biddle & Reath LLP

(57) ABSTRACT

An apparatus for an exhaust gas system includes a main exhaust passage, a main catalytic converter disposed in the main exhaust passage, a bypass exhaust passage, a bypass catalytic converter disposed in the bypass exhaust passage, and a valve configured to open or close a section of the main exhaust passage. The bypass exhaust passage bypasses the main exhaust passage between a branch point of the bypass exhaust passage out of the main exhaust passage and a junction with the main exhaust passage at a upstream side of the main catalytic converter. A first sensor indicates a first air-fuel ratio of exhaust gas in the bypass exhaust passage. A second sensor indicates a second air-fuel ratio of exhaust gas flowing into the main catalytic converter. A controller determines whether the valve in the closed configuration leaks exhaust gas based on the first and second air-fuel ratios of exhaust gas.

22 Claims, 8 Drawing Sheets

(a) Normal condition (b) Leakage (c) Catalyst deteriorated state (a) Normal condition (b) Leakage (c) Catalyst deteriorated state

DIAGNOSTIC APPARATUS FOR AN EXHAUST GAS PURIFICATION SYSTEM OF AN INTERNAL COMBUSTION ENGINE, AN EXHAUST GAS PURIFICATION SYSTEM AND A DIAGNOSTIC METHOD THEREOF

CROSS-REFERENCE TO RELATED APPLICATIONS

This application claims priority under 35 U.S.C. §119 to Japanese Patent Application No. 2006-070232, filed Mar. 15, 2006, and to Japanese Patent Application Nos. 2006-072001 and 2006-072004, both filed Mar. 16, 2006. The disclosures of all three Japanese Patent Applications are incorporated by reference herein in their entirety.

BACKGROUND OF THE INVENTION

1. Field of the Invention

The present invention pertains to the technical field of purifying exhaust gas emissions from an internal combustion engine (also referred to hereinafter as "engine"). As it is used herein, the term "purify" refers to reducing the toxicity of the exhaust gases emitted by an internal combustion engine. More particularly, the present invention pertains to diagnosing whether there is any leakage by a flow path switching valve in an exhaust gas purifying system.

Exhaust gas is introduced into a bypass exhaust gas passage that includes a bypass catalytic converter. Preferably, the bypass exhaust gas passage is disposed relatively upstream of a main catalytic converter in a conventional exhaust system, and a flow path switching valve diverts the exhaust gas through the bypass exhaust gas passage after initiating a cold start-up of the engine.

2. Description of Related Art

Generally, exhaust gas cannot be sufficiently purified between the cold start-up of an internal combustion engine and the full activation of a catalytic converter, i.e., when the catalytic converter's temperature increases sufficiently. This is especially the case when a main catalytic converter is disposed a distance downstream from the engine (e.g., underneath an automobile). However, if the main catalytic converter is disposed closer to the engine, then the durability or lifespan of the catalyst can be significantly compromised due to thermal deterioration.

A related exhaust system includes a bypass exhaust gas passage and a bypass catalytic converter, which are disposed in parallel to an upstream portion of a main exhaust gas passage leading to a main catalytic converter. A flow path switching valve is configured to introduce the exhaust gas into the bypass exhaust gas passage immediately after initiating the cold start-up of the engine. As such, since the bypass catalytic converter is disposed upstream in the exhaust system relative to the main catalytic converter, it can be activated more rapidly to thereby allow purification of exhaust gas to begin sooner.

In the related exhaust system, when the flow path switching valve does not completely switch the flow path (e.g., exhaust gas leaks into the main exhaust gas passage when it is supposed to be prevented by the flow path switching valve), unpurified exhaust gas may be discharged to the atmosphere until the main catalytic converter is fully activated.

The related exhaust system includes a method for detecting flow rate reduction as a result of using the flow path switching valve; however, the related exhaust system fails to include anything in relation to diagnosing leakage of unpurified exhaust gas. Thus, there is a need for an apparatus that can properly diagnose leakage by the flow path switching valve.

BRIEF SUMMARY OF THE INVENTION

The present invention relates to an apparatus for diagnosing an exhaust gas purifying system of an internal combustion engine. The exhaust gas purifying system includes a main exhaust gas passage connected to an internal combustion engine, and a main catalytic converter disposed downstream along the main exhaust gas passage. A bypass exhaust gas passage for bypassing the main exhaust gas passage is provided at a portion of the main exhaust gas passage that is upstream of the main catalytic converter. In addition, a bypass catalytic converter is disposed along the bypass exhaust gas passage. Further, the portion of the main exhaust gas passage that is bypassed by the bypass exhaust gas passage is provided with a valve for closing the main exhaust gas passage. The bypass exhaust gas passage has a first sensor for detecting an air-fuel ratio of exhaust gas flowing through the bypass exhaust gas passage. Also, the main exhaust gas passage has a second sensor for detecting an air-fuel ratio of exhaust gas that is introduced into the main catalytic converter. The first and second sensors are connected to a controller.

Leakage of the valve is diagnosed when the valve is in a closed state. According to an aspect of an embodiment of the present invention, such leakage is diagnosed based on the first sensor detecting the air-fuel ratio of exhaust gas that passes through the bypass exhaust gas passage and the second sensor detecting the air-fuel ratio of exhaust gas that passes through the main exhaust gas passage. Since the leakage of the valve is diagnosed using air-fuel ratio sensors that may be conventionally utilized in the control the internal combustion engine, additional sensors may not be required to perform the diagnosis.

In accordance with an aspect of an embodiment of the invention, there is provided an apparatus for diagnosing an exhaust gas purification system for an internal combustion engine. The apparatus includes a main exhaust gas passage, a main catalytic converter disposed in the main exhaust gas passage, a bypass exhaust gas passage, a bypass catalytic converter disposed in the bypass exhaust gas passage, a valve provided in the section of the main exhaust gas passage, a first sensor disposed in the bypass exhaust gas passage, a second sensor disposed in the main exhaust gas passage, and a controller. The bypass exhaust gas passage is in fluid communication with the main exhaust gas passage so as to bypass a section thereof between a branch point at which the bypass exhaust gas passage branches out of the main exhaust gas passage and a junction at which the bypass exhaust gas passage merges into the main exhaust gas passage at a upstream side of the main catalytic converter. The valve is configured to open or close the section of the main exhaust gas passage. The first sensor outputs a first signal that is indicative of a first air-fuel ratio of an exhaust gas that is flowing in the bypass exhaust gas passage. The second sensor outputs a second signal that is indicative of a second air-fuel ratio of an exhaust gas flowing into the main catalytic converter. The controller receives the first and second signals and determines whether the valve in the closed configuration leaks exhaust gas through the section of the main exhaust gas passage based on the first and second signals.

In accordance with another aspect of an embodiment of the invention, there is provided a method of diagnosing an exhaust gas purification system for an internal combustion engine. The method includes detecting a first air-fuel ratio of exhaust gas that passes through a main exhaust gas passage including a main catalytic converter, detecting a second air-fuel ratio of exhaust gas passing through a bypass exhaust gas passage, preventing exhaust gas flow along the main exhaust gas passage with a valve, and determining whether exhaust gas is leaking through the valve based on the first and second air-fuel ratios. The bypass exhaust gas passage is in fluid communication with the main exhaust gas passage so as to bypass a section thereof between a branch point at which the bypass exhaust gas passage branches out of the main exhaust gas passage and a junction at which the bypass exhaust gas passage merges into the main exhaust gas passage at a upstream side of the main catalytic converter. The bypass exhaust gas passage includes a bypass catalytic converter.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

DETAILED DESCRIPTION OF THE PREFERRED EMBODIMENTS

Hereinafter, various preferred embodiments of the present invention will be described in detail with reference to the accompanying drawings. Although certainly not limited to the following, the description is provided for an exhaust gas purifying system of a four-cylinder internal combustion engine. That is to say, internal combustion engines having different arrangements, numbers of cylinders, and implementations are also envisioned.

Figure 1:
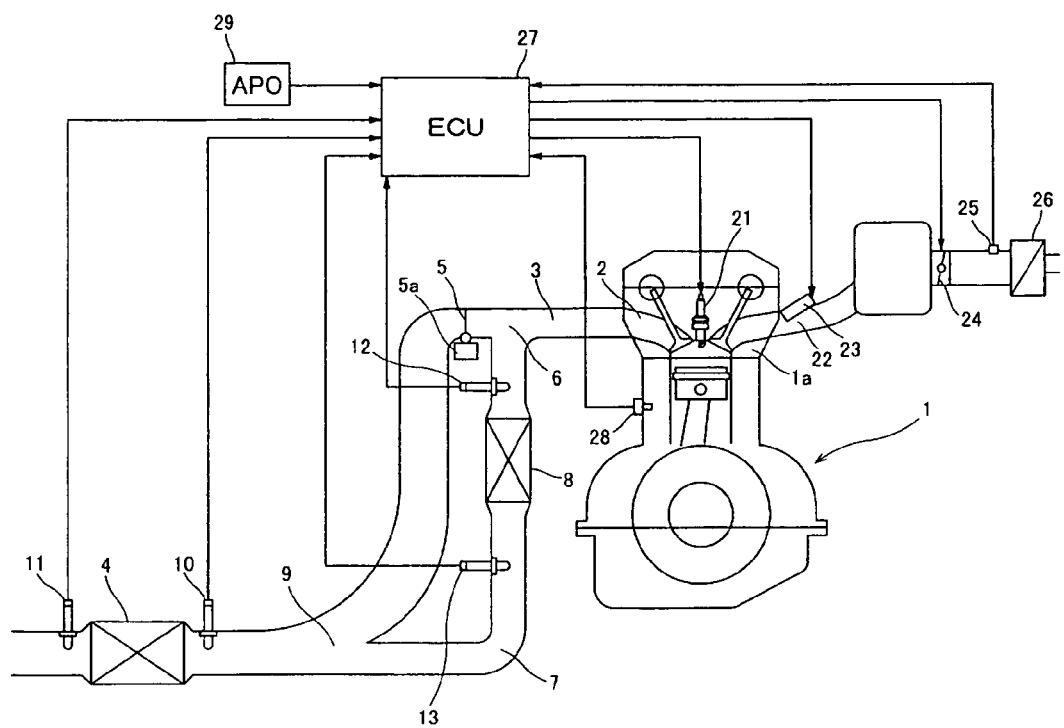
FIG. 1 is a schematic diagram illustrating an internal combustion engine exhaust system constructed in accordance with the present invention.

FIG. 1 shows a schematic layout of exhaust gas passages as well as a controller used in an exhaust system for an internal combustion engine used to propel a vehicle.

A cylinder head 1a of the internal combustion engine 1 has exhaust ports 2 laterally opening from the first to fourth cylinders (only one is shown in FIG. 1), which may be arranged inline. Each of the exhaust ports 2 (only one is shown in FIG. 1) is connected to a respective upstream portion of a main exhaust gas passage 3. The four upstream portions of the main exhaust gas passage 3 (only one is shown in FIG. 1), which correspond to the first to fourth cylinders, preferably merge at a portion at which slow path switching valve(s) 5 are disposed to form a single main exhaust gas flow passage, which is a downstream portion of the main exhaust gas passage 3, leading to a main catalytic converter 4. The main catalytic converter 4, which is preferably located underneath the vehicle, may have a large capacity and may contain a three-way catalyst as well as a hydro-carbon (HC) trap catalyst. Exhaust gas emitted from the exhaust port 2 flows through the upstream portion of the main exhaust gas passage 3, through the portion placed with the flow path switching valves 5, through the downstream portion of the main exhaust gas flow passage 3, to the main catalytic converter 4 for purifying the exhaust gas emitted during a normal engine operation. The flow path switching valves 5 may provide a closing means for changing a flow path by permitting or preventing exhaust gas flow through the main exhaust gas passage 3. The flow path switching valves 5 (only one is shown in FIG. 1), which may be butterfly valves, flap valves, or any equivalents, are provided for opening and closing the main exhaust gas passage 3. A single flow path switching valve 5 may be disposed after a merge of plural upstream portions of the main exhaust gas passage 3, e.g., four upstream portions of the main exhaust gas passage 3 connected to the first to fourth cylinders. The flow path switching valve 5 is preferably driven by an actuator 5a such as an electric motor, an electric solenoid, a vacuum switch, or any equivalent for reconfiguring the flow path switching valve 5.

Four upstream portions of a bypass exhaust gas passage 7 (only one is shown in FIG. 1) branch off from the corresponding four upstream portions of the main exhaust gas passage 3 at a respective branch point 6. The bypass exhaust gas passage 7 has a cross sectional area smaller than that of the main exhaust gas passage 3. The branch points 6 (i.e., an upstream end of each of the upstream portion of the bypass exhaust gas passage 7; only one is shown in FIG. 1) are preferably disposed upstream as far as possible in the corresponding upstream portions of the main exhaust gas passages 3, i.e., as close as possible to the cylinder head 1a. The four upstream portions of the bypass exhaust gas passage 7 preferably merge to form a single bypass exhaust gas flow passage, which is a downstream portion of the bypass exhaust gas passage 7, leading to a bypass catalytic converter 8. Preferably, the bypass catalytic converter 8, which may use a three-way catalyst, is disposed immediately after the merge of the four upstream portions of the bypass exhaust gas passage 7. Preferably, the bypass catalytic converter 8 has a capacity smaller than that of the main catalytic converter 4 and contains a catalyst that can be optimally activated at low temperatures. The single bypass exhaust gas flow passage extending from an outlet of the bypass catalytic converter 8, preferably connects at the junction 9 of the main exhaust gas passage 3 (i.e., upstream of the inlet to the main catalytic converter 4 and downstream of the flow path switching valve 5). That is, the bypass exhaust gas passage 7 is provided to bypass a section of the main exhaust gas passage 3 that are upstream of the main catalytic converter 4. The flow path switching valve 5 may be mounted in this section of the main exhaust gas passages 3.

A main upstream air-fuel ratio sensor 10 and a main downstream air-fuel ratio sensor 11 are disposed at the inlet and outlet of the main catalytic converter 4, respectively. Further, a bypass upstream air-fuel ratio sensor 12 and a bypass downstream air-fuel ratio sensor 13 are disposed at the inlet and outlet of the bypass catalytic converter 8, respectively. The main upstream and downstream air-fuel ratio sensors 10, 11 may perform conventional feedback control of the air-fuel ratio after activating the main catalytic converter 4. The engine air-fuel ratio may be controlled, e.g., by controlling the amount of fuel that is injected into the first to fourth cylinders, in response to an output signal from the main upstream air-fuel ratio sensor 10. An output signal from the main downstream air-fuel ratio sensor 11 may be used to compensate for any deviations in control characteristics. Similarly, the bypass upstream and downstream air-fuel ratio sensors 12, 13 may perform conventional feedback control of the air-fuel ratio when the bypass catalytic converter 8 is used. That is to say, when the bypass catalytic converter 8 is used, the engine air-fuel ratio may be controlled in response to an output signal from the bypass upstream air-fuel ratio sensor 12. An output signal from the bypass downstream air-fuel ratio sensor 13 may be used to compensate for any deviations in control characteristics. The air-fuel ratio sensors 10, 11, 12, 13 may include either broadband air-fuel ratio sensors, which have a substantially linear output characteristic with respect to the air-fuel ratio of the exhaust gas, or oxygen sensors, which have two output characteristics (e.g., indicating either a rich air-fuel ratio or a lean air-fuel ratio). Generally, broadband air-fuel ratio sensors are preferably used as the upstream air-fuel ratio sensors 10, 12 due to the above-described control characteristics of the air-fuel ratio control, and oxygen sensors are preferably used as the downstream air-fuel ratio sensors 11, 13 to provide a cost benefit. The bypass upstream air-fuel ratio sensor 12 may provide a first sensing means for detecting the air-fuel ratio in the bypass exhaust gas flow passage, and the main upstream air-fuel ratio sensor 10 may provide a second sensing means for detecting the air-fuel ratio of an exhaust gas flowing into the main catalytic converter 4 in the main exhaust gas flow passage.

Further, each of the first to fourth cylinders of the internal combustion engine 1 includes a spark plug 21 (only one is shown in FIG. 1), an intake passage 22 (only one is shown in FIG. 1), and a fuel injection valve 23 (only one is shown in FIG. 1), which may be disposed in the intake passage 22. Preferably, an electronically controlled throttle valve 24, which can be opened or closed using an actuator such as a motor, is disposed upstream of the intake passages 22. A plenum may be disposed between the intake passages 22 and the throttle valve 24. Additionally, an air flow meter 25 for detecting the amount of intake air used by the engine 1 may be disposed upstream of the throttle valve 24 and downstream of an air cleaner 26.

An engine control unit 27 controls various parameters of the internal combustion engine 1 (e.g., setting the amount of fuel injected by each fuel injection valve 23, setting the spark timing of each spark plug 21, setting the opening degree of the throttle valve 24, and driving the actuator 5 to set the open/close conditions of the flow path switching valve 5, etc.). In addition to receiving the output signals of the air-fuel ratio sensors 10, 11, 12, 13, output signals from other sensors, such as a coolant temperature sensor 28 and a sensor 29 for detecting the position of an accelerator pedal (i.e., stepped degree) operated by the driver, may also be input to the engine control unit 27. Preferably, the engine control unit 27 may also diagnose whether there is a leak at the flow path switching valve 5.

Preferably, the flow path switching valve 5 closes the exhaust gas passages 3 in response to a low temperature either of the engine 1 or of the exhaust gas after initiating cold start-up. Thus, the entirety of the exhaust gas discharged from each cylinder flows from the corresponding branch point 6, through the corresponding bypass exhaust gas passage 7, to the bypass catalytic converter 8. The bypass catalytic converter 8 can be rapidly activated since, for example, it is disposed in close proximity to the exhaust port 2 and it is relatively small in size. This allows the exhaust gas to be purified at an earlier stage after initiating the cold start-up.

As the temperature of the engine 1 or the exhaust gas increases during a warming-up process, the flow path switching valve 5 opens since the catalyst of the main catalytic converter 4 is fully activated by the heat. As such, most of the exhaust gas discharged from the cylinders passes through the main exhaust gas passage 3, to the main catalytic converter 4. Although the bypass exhaust gas passage 7 are not closed, most of the exhaust gas does not flow through the bypass flow exhaust gas passage 7. Rather, the exhaust gas flows through the main exhaust gas passage 3. This is because the cross-sectional areas of the bypass exhaust gas passage 7 is smaller than that of the exhaust gas passage 3 and by virtue of greater flow resistance due to the bypass catalytic converter 8 being disposed in the bypass exhaust gas flow passage. Because of the differential resistance to flow, thermal deterioration of the bypass catalytic converter 8 may also be avoided.

Next, a diagnosis in accordance with a first embodiment of the present invention as to whether there is any leakage past the flow path switching valve 5 will be described. In the following embodiments, the two upstream air-fuel ratio sensors 10, 12 are preferably broadband air-fuel ratio sensors, whereas the two downstream air-fuel ratio sensors 11, 13 are preferably oxygen sensors. Only the two upstream air-fuel ratio sensors 10, 12 are employed when diagnosing leakage in accordance with the first embodiment of the present invention.

Figure 2:
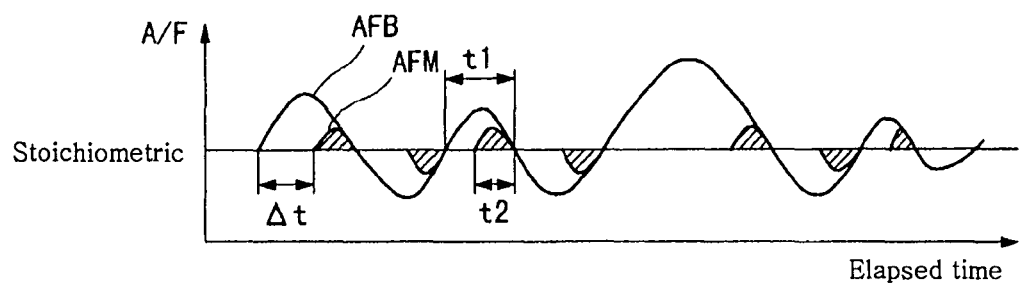
FIG. 2 is a graph illustrating a leakage diagnosis in accordance with a first embodiment according to the present invention.
Figure 2:
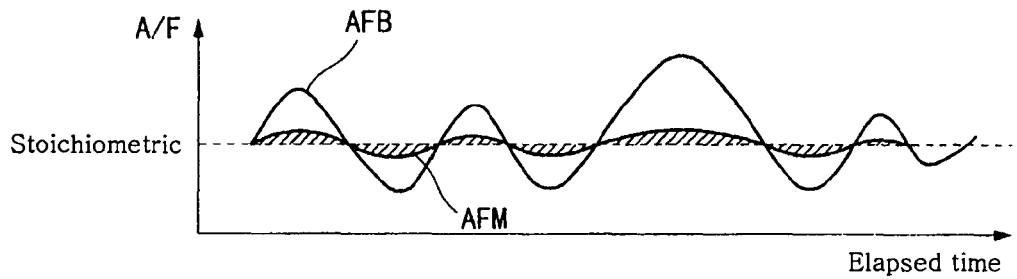
Figure 2:
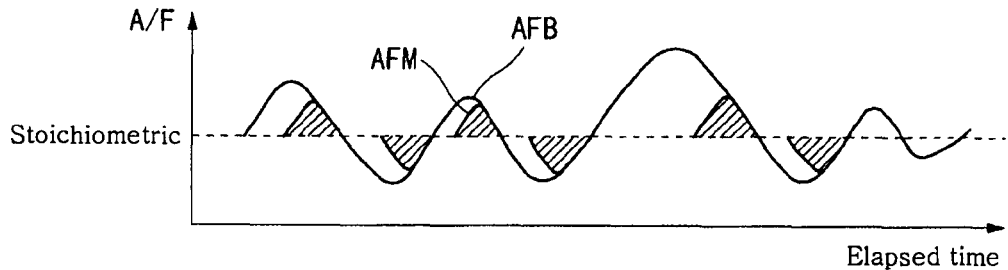

FIG. 2 is a series of graphs illustrating the first embodiment for diagnosing a leak when the flow path switching valve 5 is in a closed-state after initiating cold start-up and the bypass upstream air-fuel ratio sensor 12 provides feedback control of the air-fuel ratio (i.e., after activating the bypass catalytic converter 8). The feedback control starts almost immediately after the cold start-up since the bypass catalytic converter 8 can be rapidly activated, as described above. The diagnosis may also be performed after activating the main catalytic converter 4 by temporarily closing the flow path switching valve 5.

FIG. 2a is a graph illustrating a comparison between an air-fuel ratio AFB detected by the bypass upstream air-fuel ratio sensor 12 (also referred to hereinafter as the air-fuel ratio AFB), and an air-fuel ratio AFM detected by the main upstream air-fuel ratio sensor 10 (also referred to hereinafter as the air-fuel ratio AFM) during normal conditions, i.e., when there is no leakage and no thermal deterioration of the bypass catalytic converter 8. As shown in FIG. 2a, according to conventional air-fuel feedback control, the amount of fuel injection fluctuates periodically to allow the exhaust air-fuel ratio to transition around an ideal air-fuel ratio (i.e., stoichiometric state). Thus, the air-fuel ratio changes periodically from the stoichiometric state to each of a rich state and a lean state of combustion by the engine 1. However, since the bypass upstream air-fuel ratio sensor 12 is directly influenced by the exhaust gas from the engine 1, the output signal corresponding to the fluctuation in the engine air-fuel ratio can be determined. That is, the air-fuel ratio AFB detected by the bypass upstream air-fuel ratio sensor 12 corresponds to the engine air-fuel ratio, or may be regarded as the engine air-fuel ratio itself. Compared to the air-fuel ratio AFB detected by the bypass upstream air-fuel ratio sensor 12, the graph for the air-fuel ratio AFM detected by the main upstream air-fuel ratio sensor 10 shows that the rich/lean state, which exceeds the ideal air-fuel ratio, can be achieved in a shorter amount of time. It further shows that the change timing, i.e., the point at which there is a change between stoichiometric, rich and lean states, is delayed compared to that of the air-fuel ratio AFB detected by the bypass upstream air-fuel ratio sensor 12. This is due to the oxygen capacity of the catalyst for the bypass catalytic converter 8. Oxygen is absorbed when the exhaust air-fuel ratio turns to a lean state and is discharged when the exhaust air-fuel ratio turns to a rich state. Thus, although the exhaust air-fuel ratio periodically fluctuates between rich and lean states, there is no change at the downstream side of the bypass catalytic converter 8 until the oxygen capacity of the bypass catalytic converter 8 is saturated.

FIG. 2b shows the associated characteristics when there is an exhaust gas leak by the flow path switching valve 5 in its closed-state. Since such leakage does not affect the air-fuel ratio AFB detected by the bypass upstream air-fuel ratio sensor 12, there is no change from the normal state shown in FIG. 2a. However, the main upstream air-fuel ratio sensor 10 detects the exhaust gas that leaks past the flow path switching valve 5, i.e., the exhaust gas that does not pass through the bypass catalytic converter 8. Thus, the detected air-fuel ratio AFM fluctuates between rich and lean states at the same times as when the bypass upstream air-fuel ratio sensor 12 detects the air-fuel ratio AFB. Further, the value of the rich/lean state (i.e., the amplitude of the periodic variation) is lower than that of the air-fuel ratio AFB detected by the bypass upstream air-fuel ratio sensor 12. This is due to the dilution that results from the mixture with the exhaust gas that does pass through the bypass catalytic converter 8.

For example, a time delay Δt may be determined between the time at which a rich state changes to a lean state, or vice-versa, in the air-fuel ratio AFM as detected by the main upstream air-fuel ratio sensor 10 and the corresponding time (i.e., at which rich state changes to lean state, or vice-versa) in the air-fuel ratio AFB as detected by the bypass upstream air-fuel ratio sensor 12. If the time delay Δt is smaller than a threshold value, then the occurrence of leakage is determined.

Referring again to FIG. 2a, an interval t1 of the rich or lean state in the air-fuel ratio AFB detected by the bypass upstream air-fuel ratio sensor 12 may be compared with an interval t2 of the corresponding rich or lean state in the air-fuel ratio AFM detected by the main upstream air-fuel ratio sensor 10. If the intervals t1 and t2 are substantially equal, then the occurrence of leakage is determined.

Alternate methods for determining whether the leakage occurs may provide additional reliability. For example, determining leakage may include calculating the mean value from a plurality of air-fuel ratio variations, or evaluating the time delay Δt that is substantially equivalent to the difference (t1−t2) between the intervals t1 and t2. Methods using these features will now be described.

FIG. 2c shows the variation in the air-fuel ratio AFM when the catalyst of the catalytic converter 8 is somewhat deteriorated. When the oxygen capacity is lowered due to catalyst deterioration, the fundamental variation in the air-fuel ratio AFM detected by the main upstream air-fuel ratio sensor 10 does not change. However, the rich/lean state fluctuates more quickly. That is, the time delay Δt with respect to the change in the air-fuel ratio AFB detected by the bypass upstream air-fuel ratio sensor 12 becomes shorter. However, the time interval t2 of rich/lean state becomes longer. If the catalyst has deteriorated to the point of zero oxygen capacity, then the time delay Δt or the time intervals t1 and t2 may not be distinguishable from the case shown in FIG. 2b. However, since the catalyst deterioration actually progresses slowly, the time delay Δt or the time intervals t1 and t2 takes on intermediate values, i.e., between the characteristics shown in FIGS. 2a and 2b, when the catalyst is partially deteriorated. Therefore, at this stage, it can be determined that the catalyst has deteriorated. Thus, catalyst deterioration may be distinguished from determining that there is a leak by the flow path switching valve 5.

For example, if the time delay Δt is less than a first threshold value, then it can be determined that leakage has occurred. However, if the time delay Δt is greater than a second threshold value, then it can be determined that no leakage has occurred. Further, if the time delay Δt falls in a predetermined range, e.g., between third and fourth threshold values that are themselves between the first and second threshold values, then it can be determined that the catalyst in the bypass catalytic converter 8 has deteriorated. The third and fourth threshold values may be equal to the first and second threshold values, respectively.

A determination is made of the interval t1 of a rich or lean state in the air-fuel ratio AFB as detected by the bypass upstream air-fuel ratio sensor 12 and of the interval t2 corresponding to a rich or lean state in the air-fuel ratio AFM as detected by the main upstream air-fuel ratio sensor 10. If the intervals t1 and t2 are substantially equal to each other, then the occurrence of leakage is determined. Also, if the interval t2 is sufficiently less than the interval t1, then it may be determined that no leakage has occurred. If the interval t2 is somewhat shorter than the interval t1, then it can be determined that the catalyst in the bypass catalytic converter 8 has deteriorated.

According to the above embodiment, the leakage of the flow path switching valve 5 can be diagnosed even while a conventional feedback control of the air-fuel ratio continues. Moreover, the toxicity of the exhaust gas is not worsened when such diagnosis is performed. Furthermore, it is possible to perform an accurate leakage diagnosis, including determining whether the catalyst has deteriorated.

Figure 3:
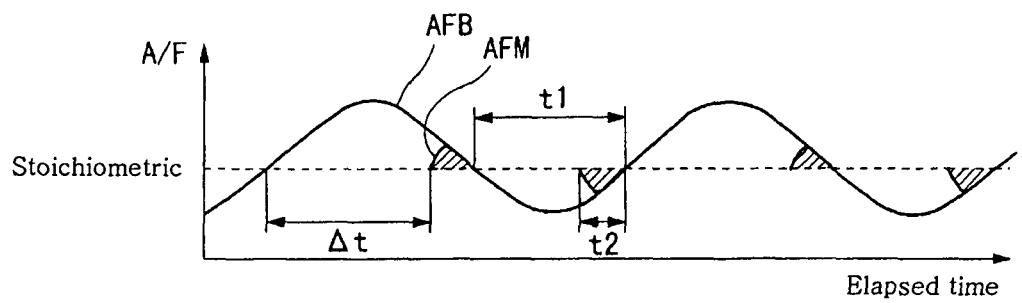
FIG. 3 is a graph illustrating a leakage diagnosis in accordance with a second embodiment according to the present invention.
Figure 3:
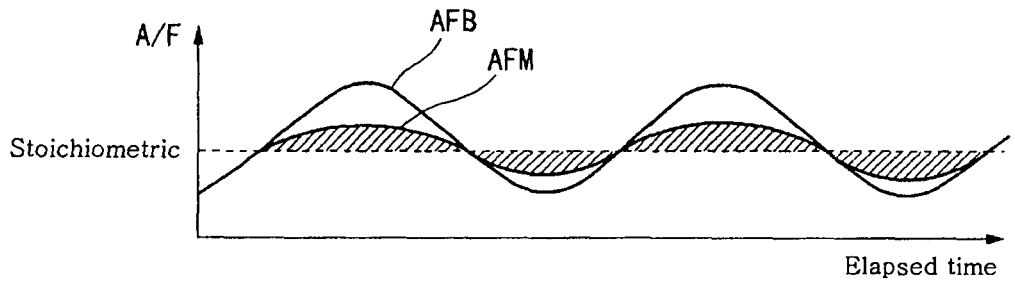
Figure 3:
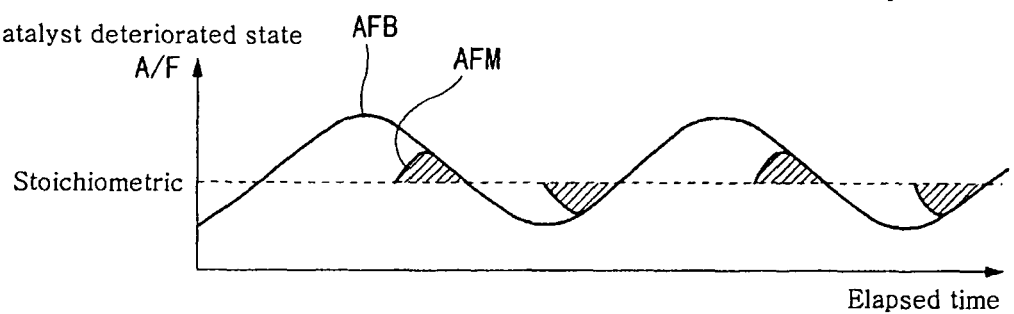

FIG. 3 is a series of graphs illustrating a second embodiment according to the present invention for diagnosing a leak after the bypass catalytic converter 8 is activated when the flow path switching valve 5 is in a closed-state after initiating cold start-up. During this diagnosis, the engine air-fuel ratio is forcibly changed by a feed-forward control (i.e., from rich to lean or vice-versa) at a constant period and amplitude.

Similar to FIGS. 2a to 2c, FIG. 3a shows the normal state (no leakage and no catalyst deterioration), whereas FIG. 3b shows the occurrence of leakage, and FIG. 3c shows the deterioration of the catalyst. It should be noted that the diagnosis method is the same as that of the first embodiment.

According to the first embodiment shown in FIG. 2, the change in the period and amplitude for rich/lean states of the engine air-fuel ratio is not necessarily constant with respect to the driving condition of the engine 1. However, according to the second embodiment, the engine air-fuel ratio changes regularly at a constant period and amplitude. This may enhance the accuracy of diagnosing leakage and catalyst deterioration. Further, even when the engine air-fuel ratio is forcibly changed in a feed-forward control, the rich/lean state is periodically changed with respect to the ideal air-fuel ratio so that the average air-fuel ratio may be maintained near the ideal air-fuel ratio. Therefore, the toxicity of the exhaust gas is not worsened. Preferably, the period for the change in engine air-fuel ratio is set to be not so long as to significantly reduce the oxygen capacity of the catalyst.

According to embodiments of the present invention, an apparatus is provided for diagnosing an exhaust gas purifying system of an internal combustion engine. The apparatus includes bypass exhaust gas passages that are disposed upstream of a main catalytic converter. A bypass catalytic converter is provided along the bypass exhaust gas passages, and a flow path switching valve is provided for diverting the exhaust gas through the bypass exhaust gas passage. The apparatus also includes a first air-fuel ratio sensor for detecting an air-fuel ratio of the exhaust gas upstream of the bypass catalytic converter, and a second air-fuel ratio sensor for detecting an air-fuel ratio of the exhaust gas upstream of the main catalytic converter. The flow path switching valve can be diagnosed for leakage by using detected signals from the first and second sensors when the flow path switching valve is in a closed state.

When an engine air-fuel ratio is periodically changed between rich and lean states, leakage by the flow path switching valve can be diagnosed according to the following two steps: (i) determining a time delay in the change between rich and lean states as detected by the second air-fuel ratio sensor with respect to a similar change between states as detected by the first air-fuel ratio sensor; and (ii) determining whether there is leakage based on the time delay.

Alternatively, when an engine air-fuel ratio is periodically changed between rich and lean states, leakage by the flow path switching valve can be diagnosed according to the following two steps: (i) determining a time interval in the change between rich and lean states as detected by the second air-fuel ratio sensor and a similar time interval between states as detected by the first air-fuel ratio sensor; and (ii) determining whether there is leakage by comparing the time intervals.

To periodically change between rich and lean states, there can be employed a periodic change in the engine air-fuel ratio via feedback control using the first air-fuel ratio sensor.

Alternatively, the engine air-fuel ratio may be periodically changed in a predetermined period during diagnosis. Further, since the average air-fuel ratio is substantially maintained at the ideal air-fuel ratio, even in case of a forcible periodic changes in the engine air-fuel ratio, the toxicity of the exhaust gas is not worsened.

When the flow path switching valve 5 for opening/closing the main exhaust gas passage 3 is in the closed position, the entirety of the exhaust gas from the internal combustion engine 1 is introduced into the bypass exhaust gas passage and passes through the bypass catalytic converter. However, when the flow path switching valve 5 is in the open position, most of the exhaust gas from the internal combustion engine 1 flows bypasses the bypass catalytic converter 8 and then passes through the main catalytic converter 4. This is due to the differential flow resistance in the main and bypass exhaust gas passages 3, 7.

Preferably, the diagnosis for determining whether there is any leakage past the flow path switching valve 5 is performed when the flow path switching valve 5 is in the closed position. For example, the diagnosis can be performed by using the periodic change in the engine air-fuel ratio in response to feedback control of the air-fuel ratio. When the engine air-fuel ratio is changed periodically, the signal detected by the first air-fuel ratio sensor 12 is also periodically changed with the engine air-fuel ratio. This is because the first air-fuel ratio sensor 12 is disposed upstream of the bypass catalytic converter 8. However, the air-fuel ratio of the exhaust gas downstream of the bypass catalytic converter 8 varies in a relatively small range, with a time delay relative to the engine air-fuel ratio due to the oxygen capacity of the catalyst.

If the flow path switching valve 5 does not leak, then the second air-fuel ratio sensor 10 disposed upstream of the main catalytic converter 4 receives only the exhaust gas that has already passed through the bypass catalytic converter 8. As a result, the air-fuel ratio detected by the second air-fuel ratio sensor 10 varies in a relatively small range, with a time delay relative to the periodic change in the exhaust air-fuel ratio, as described above. However, if the flow path switching valve 5 leaks, then the air-fuel ratio detected by the second air-fuel ratio sensor 10 varies at approximately the same time as that of the exhaust air-fuel ratio. Thus, the air-fuel ratio detected by the second air-fuel ratio sensor 10 also varies with respect to the air-fuel ratio detected by the first air-fuel ratio sensor 12. This is because at least some of the exhaust gas from the engine 1 directly passes to the second air-fuel ratio sensor 10, i.e., without passing through the bypass catalytic converter 8. For example, if the difference between the distance from the exhaust port 2 to the first air-fuel ratio sensor 12 and the effect of the distance from the exhaust port 2 to the second air-fuel ratio sensor 10 is ignored, then the rich/lean states of the air-fuel ratios detected by first and second air-fuel ratio sensors 12, 10 will vary at the same time when the flow path switching valve 5 leaks.

Therefore, whether or not the leakage occurs, or what the level of such leakage is, can be diagnosed by the time delay or the time interval in the change of the rich/lean states.

As mentioned above, oxygen capacity may be influenced by deterioration of the catalyst. However, if deterioration has occurred, the change timings between the rich/lean states detected by the first and second air-fuel ratio sensors 12, 10 do not completely coincide with each other. Further, the time delay becomes shorter depending on the deterioration level. Therefore, whether or not the leakage occurs can be determined even if there is catalyst deterioration.

According to the above embodiment, any leakage by the flow path switching valve can be properly and easily diagnosed, thereby avoiding unpurified exhaust gas from being discharged to the atmosphere during an early stage of engine start-up.

If, during diagnosis, the rich/lean state is periodically changed with respect to the ideal air-fuel ratio, the average air-fuel ratio may be equal to, or at least closer to, the ideal air-fuel ratio. Thus, the toxicity of the exhaust emission is not worsened.

Next, a third embodiment according to the present invention will be described for diagnosing leakage of the flow path switching valve 5. In the third embodiment, the exhaust system is identical to that of the first embodiment and the arrangement of the exhaust and control systems are identical to those illustrated in FIG. 1. In the third embodiment, the bypass upstream air-fuel ratio sensor 12 may provide a first air-fuel ratio detecting means, and the main upstream air-fuel ratio sensor 10 may provide a second air-fuel ratio detecting means. The main upstream air-fuel ratio sensor 10 is mounted at a section of the main exhaust gas flow passage that is between the junction 9 and the main catalytic converter 4. Such a sensor 10 is for detecting the air-fuel ratio for the exhaust gas downstream of the junction 9 at which the bypass exhaust gas flow passage joins the main exhaust gas flow passage. Preferably, the two upstream air-fuel ratio sensors 10, 12 include broadband air-fuel sensors, whereas the two downstream air-fuel ratio sensors 11, 13 include oxygen sensors. Moreover, in the third embodiment, although the engine air-fuel ratio may be changed immediately from rich to lean or vice-versa, only the change from lean to rich will be described.

Figure 4:
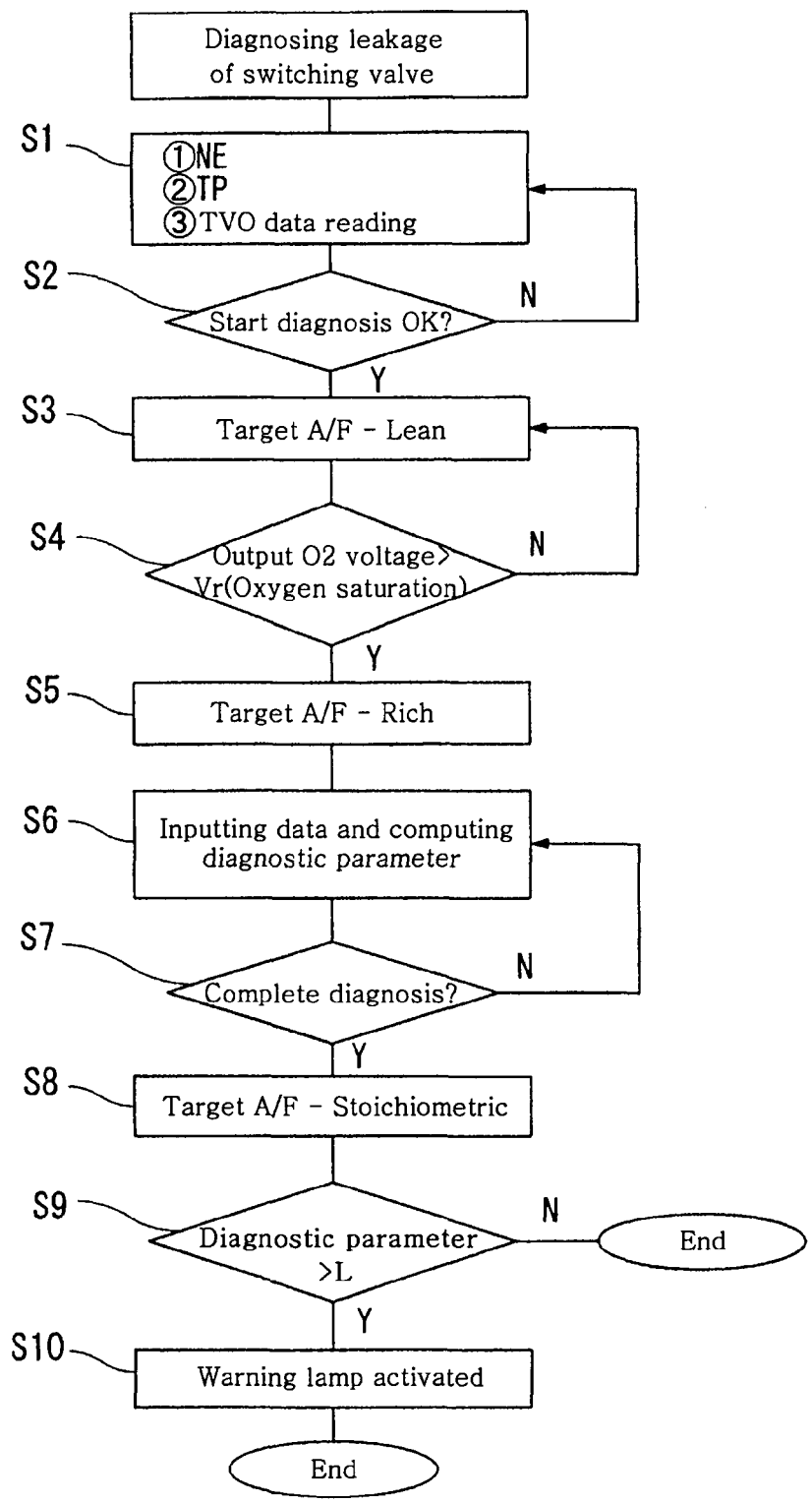
FIG. 4 is a flow chart illustrating the process for diagnosing leakage in accordance with a third embodiment according to the present invention.

FIG. 4 shows a flow chart illustrating the diagnosis process according to the third embodiment. First, the engine angular speed NE (e.g., in terms of rotations per minute), engine load TP (e.g., in terms of amount of fuel being injected), and an opening degree TVO of the throttle valve 24 are read (step S1). Then, a determination is made as to whether or not a diagnosis can be performed based on the operative conditions NE, TP, TVO (step S2). The diagnosis is performed when the bypass catalytic converter 8 is activated, the main catalytic converter 4 is not in a hot temperature atmosphere, and the flow path switching valve 5 is in a closed position. If it is determined that a diagnosis can be performed, then the target air-fuel ratio of the internal combustion engine is set to the lean state (step S3). Then, a stand-by mode occurs until the signal output from the bypass downstream air-fuel sensor 13 is indicative of a lean state (step S4). That is, the engine air-fuel ratio is kept in a lean state until the oxygen capacity of the bypass catalytic converter 8 is saturated. Thereafter, the target air-fuel ratio is changed immediately to a rich state (step S5). Under such conditions, while the changes of the output signals from the bypass upstream air-fuel ratio sensor 12 and the main upstream air-fuel ratio sensor 10 are monitored, a diagnostic parameter (as will be described hereinafter) is calculated (step S6). If the diagnosis for a predetermined time period is completed after setting the target air-fuel ratio to the rich state (step S7), then the target air-fuel ratio is reverted to the ideal air-fuel ratio (step S8). Then, the diagnostic parameter is compared with a threshold value L for determining leakage (step S9). Whether the diagnosis is completed can be determined based on, for example, the elapsed time from changing to the rich state (step S5). Alternatively, the diagnosis can be completed when the output signal of the bypass downstream air-fuel ratio sensor 13 is indicative of a rich state. At step S9, if it is determined that the diagnostic parameter is greater than the threshold value L, then leakage by the flow path switching valve 5 is determined to have occurred, and an alert may be generated, e.g., activating a warning lamp (not shown), to notify the vehicle operator or vehicle service personnel that an error condition exists (step S10).

Figure 5:
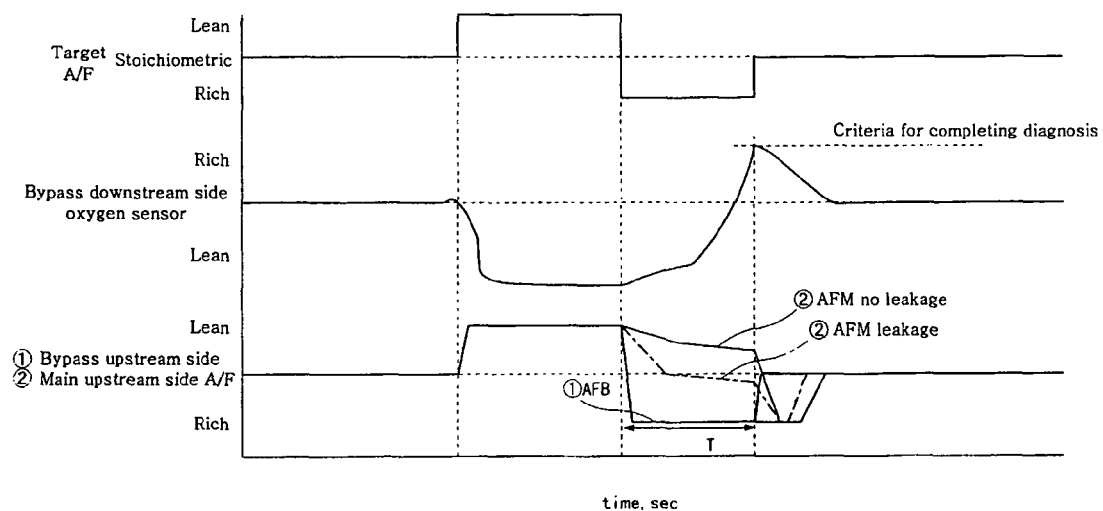
FIG. 5 is a time chart illustrating the leakage diagnosis in accordance with the embodiment shown in FIG. 4.

FIG. 5, which is a time chart for determining leakage, shows the following: changes in the target engine air-fuel ratio of the internal combustion engine 1, the output signal of the bypass downstream air-fuel ratio sensor 13, the air-fuel ratio AFM detected by the main upstream air-fuel ratio sensor 10, and the air-fuel ratio AFB detected by the bypass upstream air-fuel ratio sensor 12. As mentioned above, the target engine air-fuel ratio is forcibly changed into a lean state from the ideal air-fuel ratio for purposes of diagnosis and then changed immediately to a rich state. Then, since the flow path switching valve 5 is closed, the exhaust gas flows through the bypass exhaust gas passage 7 and oxygen is stored in the catalyst of the bypass catalytic converter 8 during the lean state. To this end, the output signal of the bypass downstream air-fuel ratio sensor 13, which is disposed downstream of the bypass catalytic converter 8, changes to indicate a lean state after a time delay. Further, both the bypass upstream air-fuel ratio sensor 12 and the main upstream air-fuel ratio sensor 10 indicate the exhaust air-fuel ratio in the lean states. Moreover, in the third embodiment, the target air-fuel ratio is changed to the rich state with a time delay after the signal from the bypass downstream air-fuel ratio sensor 13 indicates the lean state.

When the engine air-fuel ratio is changed to the rich state, the air-fuel ratio AFB detected by the bypass upstream air-fuel ratio sensor 12 disposed upstream of the bypass catalytic converter 8 is immediately changed to the rich state. However, since the oxygen stored in the bypass catalytic converter 8 is discharged, downstream of the bypass catalytic converter 8 the air-fuel ratio AFM detected by the main upstream air-fuel ratio sensor 10 is not immediately changed, i.e., it changes to the rich state after a time delay as indicated by a solid line. That is, as shown by the solid line, when there is no leakage, the air-fuel ratio AFB detected by the bypass upstream air-fuel ratio sensor 12 is significantly different from the air-fuel ratio AFM detected by the main upstream air-fuel sensor 10.

However, if the flow path switching valve 5 leaks, e.g., due to sealing defects or the like in the valve body, a partial amount of exhaust gas reaches the main upstream air-fuel ratio sensor 10 without passing through the bypass catalytic converter 8. Accordingly, the air-fuel ratio AFM detected by the main upstream air-fuel ratio sensor 10 indicates a relatively richer state as indicated by a chain line. In other words, when the leakage occurs, the air-fuel ratio AFM detected by the main upstream air-fuel sensor 10 is relatively closer to the air-fuel ratio AFB detected by the bypass upstream air-fuel ratio sensor 12 depending on the level of the leakage. As such, there is at least a small difference between both air-fuel ratios. Further, when all the oxygen stored in the catalyst is discharged, the output signal of the bypass downstream air-fuel ratio sensor 13 indicates a lean state having a predetermined level, and the target engine air-fuel ratio is changed bask to the ideal air-fuel ratio at this stage.

As mentioned above, whether or not there is any leakage can be determined based on the output signal from the main upstream air-fuel ratio sensor 10 and the bypass upstream air-fuel ratio sensor 12. Such a determination can be made after the engine air-fuel ratio changes between the lean or rich states with respect to the ideal air-fuel ratio, which is interposed between the lean or rich states. Specifically, the diagnosis can be conducted by using the change timing of the detected air-fuel ratio or the difference in the detected air-fuel ratios (as will be described hereinafter).

In other words, to represent the leakage level using numerical values, it is preferable during a predetermined time period T after changing the target engine air-fuel ratio to determine an average value (AVAFM) of the air-fuel ratio AFM as detected by the main upstream air-fuel ratio sensor 10 and to determine an average value (AVAFB) of the air-fuel ratio AFB as detected by the bypass upstream air-fuel ratio sensor 12. Thus, the above-mentioned diagnostic parameter may be determined as a difference between the average values, i.e., AVAFM−AVAFB. The diagnostic parameter is then compared with the predetermined threshold value L. The threshold value L may be predetermined according to the leakage level to be detected. If the diagnosis for detecting a lower level of leakage is required, then the threshold value should be set to a greater value (however, more detection errors are likely to occur with a greater threshold value). Further, the time period T may be set, for example, to include the entire time period during which the target engine air-fuel ratio is in a lean state, or to include only a portion of the entire time period.

The diagnosis, which uses the diagnostic parameter based on the detected air-fuel ratios, provides the following effects. Insofar as a broadband air-fuel ratio sensor can be very sensitive to even a small change in the air-fuel ratio, its output signal can change immediately in response to even a small change in the exhaust air-fuel ratio without any leakage (even downstream of the catalyst; see FIG. 5). Therefore, it may be difficult to perform a diagnosis based solely on the change timing of the output signals. However, when a difference is detected between the air-fuel ratios according to whether or not the flow path switching valve 5 is leaking, the average values of the air-fuel ratios detected during the predetermined interval are particularly useful as the diagnostic parameter. Thus, the accuracy of the diagnosis may be improved as compared to using the time difference with only one set of points according to the change timing method.

As mentioned above with regard to the third embodiment, any leakage by the flow path switching valve 5 may be easily diagnosed by using conventional air-fuel ratio sensors 10, 11, 12, 13, which are otherwise provided for the conventional feedback control of the air-fuel ratio. Therefore, without additional sensors, it is possible to avoid unnecessarily toxic exhaust gas emissions due to sealing defects or the like in the flow path switching valve 5.

Further, oxygen can be fully stored in the catalyst up to a saturated state or the catalyst can be maintained at an oxygen-empty state until the air-fuel ratio is changed from lean to rich states, and vice-versa, with respect to the ideal air-fuel ratio. This may increase the accuracy of the diagnosis since it can maximize the difference between the detected air-fuel ratios. In the third embodiment, a proper time delay is given after the output signal from the bypass downstream air-fuel ratio sensor 13 indicates a lean state, and the engine air-fuel ratio is initially set to the lean state to increase the amount of oxygen stored in the catalyst of the bypass catalytic converter 8. As such, the catalyst can be in a fully saturated state. Further, unpurified HC is not discharged until the oxygen is saturated.

However, when the engine air-fuel ratio is initially set to a rich state, the amount of oxygen stored in the catalyst decreases. Further, the oxygen introduced into the catalyst remains stored in the catalyst after the engine air-fuel ratio is set to a lean state. Therefore, if there is no leakage, then the main upstream air-fuel ratio sensor 10 indicates a change to the lean state after a time delay. If the main upstream air-fuel ratio sensor 10 rapidly changes to the lean state, then there is leakage.

Since the above diagnosis depends on the oxygen capacity of the catalyst in the bypass catalytic converter 8, such diagnosis may be influenced if the oxygen capacity is lowered due to deterioration of the catalyst. Thus, although the threshold value L may be a constant value, it is helpful to adjust the threshold value according to the level of catalyst deterioration, and thereby increase the accuracy of the diagnosis.

Figure 6:
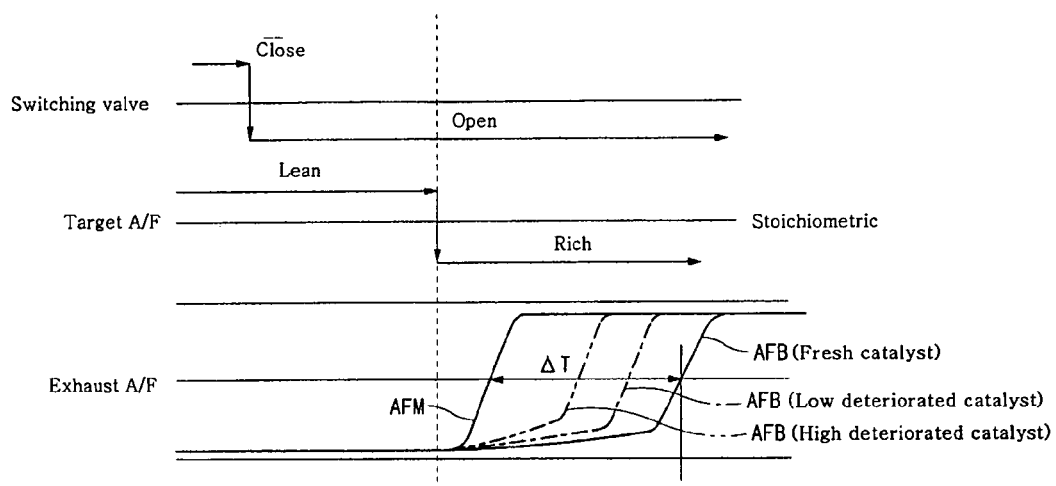
FIG. 6 is a time chart illustrating a process of diagnosing a catalyst deterioration level.
Figure 7:
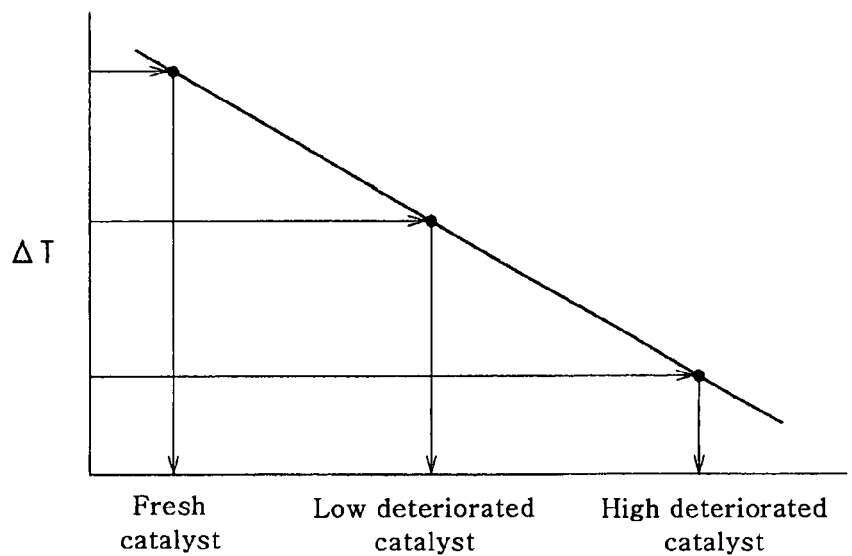
FIG. 7 is a graph illustrating the relationship between a time difference ΔT and the catalyst deterioration level.

FIG. 6 is a time chart illustrating a preferred method for diagnosing the catalyst deterioration level of the bypass catalytic converter 8. Such diagnosis method is performed in an open condition of the flow path switching valve 5. The flow path switching valve 5 may be forcibly opened for purposes of diagnosing the catalyst deterioration. Further, the target air-fuel ratio of the internal combustion engine 1 is changed immediately from the lean state to the rich state in the open condition of the flow path switching valve 5. The time difference ΔT is then measured. The time difference ΔT refers to a difference between the times for the change of state of the air-fuel ratio AFM as detected by the main upstream air-fuel ratio sensor 10 and the change of state of the air-fuel ratio AFB as detected by the bypass downstream air-fuel ratio 13. If the engine air-fuel ratio is set to a rich state, then the air-fuel ratio AFM as detected by the main upstream air-fuel ratio sensor 10 immediately indicates a rich state. This is because the flow path switching valve 5 is in the open-state, while the air-fuel ratio AFB detected by the bypass downstream air-fuel ratio 13 (also referred to as a third means for detecting an exhaust air-fuel ratio downstream of the bypass catalytic converter 8) changes to indicate a rich state after a time delay due to the oxygen capacity of the catalyst. Thus, if the bypass catalytic converter 8 is relatively new with no deterioration, the time difference ΔT becomes large. The time difference ΔT becomes smaller as the level of deterioration increases. Thus, as illustrated in FIG. 7, the catalyst deterioration level can be determined from the time difference ΔT. Moreover, the catalyst deterioration level can be measured, for example, by using the change in the air-fuel ratio during a so-called "fuel cut-off and recovery" process, wherein the fuel is cut-off during deceleration and is recovered after the fuel is cut-off.

Figure 8:
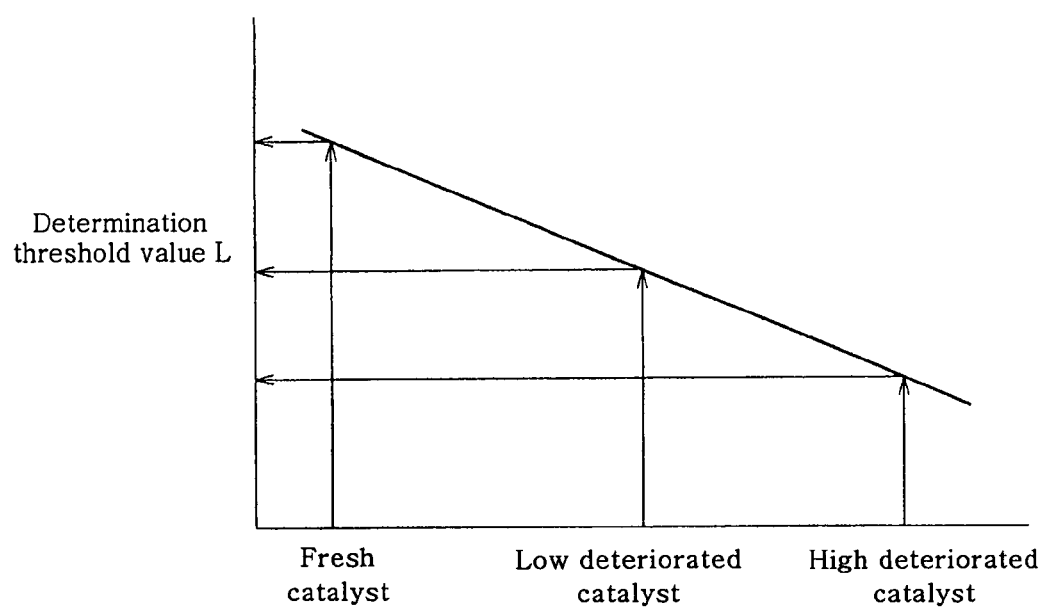
FIG. 8 is a graph illustrating the relationship between the catalyst deterioration level and a threshold value L.

Referring additionally to FIG. 8, the threshold value L can be determined, for example, by using the catalyst deterioration level. As a result, the threshold value L may be adjusted to reflect the catalyst deterioration level. Hence, the diagnosis of leakage can be accurately performed. Insofar as the diagnosis of catalyst deterioration level is performed in an open condition of the flow path switching valve 5, it is possible to accurately determine whether or not the leakage occurs in the flow path switching valve 5. This is because the valve-opened state enables the catalyst deterioration level to be measured without being influenced by any leakage. Further, whether or not the leakage occurs can be determined based on the measured catalyst deterioration level. Although a linear characteristic is schematically shown in FIGS. 7 and 8, non-linear characteristics are also envisioned. Additionally, alternative methods may be used to diagnosis the level of catalyst deterioration.

In the third embodiment of the present invention, an exhaust gas purifying system includes the bypass exhaust gas passage 7 provided upstream of the main exhaust gas flow passage leading to the main catalytic converter 4. The bypass exhaust gas passage 7 lead to the bypass catalytic converter 8. A flow path switching valve 5 for blocking exhaust gas flow is provided upstream of the main exhaust gas flow passage. Further, the purifying system includes a first air-fuel ratio detection means for detecting an exhaust air-fuel ratio upstream of the bypass catalytic converter 8, a second air-fuel ratio detection means for detecting an exhaust air-fuel ratio upstream of the main catalytic converter 4, an air-fuel ratio control means for changing immediately an engine air-fuel ratio between lean and rich states with respect to the ideal air-fuel ratio when the flow path switching valve 5 is in a closed condition, and a diagnostic means for diagnosing whether there is any leakage by the flow path switching valve 5 based on the air-fuel ratios detected by the first and second air-fuel ratio detection means after the immediate changes of the engine air-fuel ratio.

The immediate change of the engine air-fuel ratio is preferably from the lean state to the rich state, while maintaining a sufficient time necessary for saturating the oxygen in the bypass catalytic converter 8.

In the exhaust gas purifying system according to the third embodiment, when the flow path switching valve 5 is in the closed condition, preferably all of the exhaust gas from the engine 1 is introduced into the bypass exhaust gas passage 7 and passes through the bypass catalytic converter 8. However, when the flow path switching valve 5 is in the open condition, preferably most of the exhaust gas from the engine 1 avoids the bypass exhaust gas passage 7 due to the greater differential flow resistance with respect to the exhaust gas passages 3.

Diagnosing whether the flow path switching valve 5 is leaking may be performed by changing the engine air-fuel ratio, e.g., from lean state to rich state, when the flow path switching valve 5 is set to be in the closed condition. In such a case, excess oxygen during the lean state of the engine air-fuel ratio is stored in the catalyst according to the oxygen capacity of the bypass catalytic converter 8. However, oxygen is discharged when the engine air-fuel ratio is set to the rich state. Thus, although the engine air-fuel ratio is set to the rich state, the air-fuel ratio detected by the second air-fuel ratio detection means does not immediately indicate a rich state due to the influence of the discharging oxygen so long as the flow path switching valve 5 is not leaking. In other words, the exhaust air-fuel ratio detected by the second air-fuel ratio detection means is relatively leaner than the engine air-fuel ratio immediately after changing the engine air-fuel ratio. However, when the flow path switching valve 5 is leaking, the exhaust air-fuel ratio detected by the second air-fuel ratio detecting means can be even leaner due to the relatively rich state of the leaked exhaust gas. Therefore, leakage by the flow path switching valve and the level of such leakage may be determined by using these factors. When the engine air-fuel ratio is set from rich to lean, the leakage diagnosis may also be influenced by the oxygen capacity of the bypass catalytic converter 8.

In the third embodiment of the present invention, determining whether or not there is a leak depends on the difference between the average air-fuel ratios detected by the first and second air-fuel ratio detection means after the immediate changes in the engine air-fuel ratio.

The oxygen capacity may be influenced by the catalyst deterioration level. Thus, it is preferable to provide a catalyst deterioration detecting means for measuring the catalyst deterioration level. This is so that the leakage diagnosis can be corrected or adjusted for according to the catalyst deterioration level.

For example, when such diagnosis is performed by comparing the difference between the average air-fuel ratios to the threshold value, the threshold value may be modified depending on the catalyst deterioration level. By doing so, the accuracy of the diagnosis can be enhanced.

According to the third embodiment, determining at an early stage whether the flow path switching valve 5 is leaking may help to avoid the discharge of unpurified exhaust gas to the atmosphere.

Moreover, adjusting the diagnosis to reflect the catalyst deterioration level may improve the accuracy of the diagnosis.

Next, a method of diagnosing whether the flow path switching valve 5 is leaking will be described with respect to a fourth embodiment of the present invention. The exhaust system of the fourth embodiment is the same as that of the first embodiment, and the arrangement of the exhaust gas passages and the control system of exhaust system is identical to that illustrated in FIG. 1. In the fourth embodiment, the bypass downstream air-fuel ratio sensor 13 provides a first air-fuel ratio detecting means, and the main upstream air-fuel ratio sensor 10 provides a second air-fuel ratio detecting means. The main upstream air-fuel ratio sensor 10 is mounted at a section of the main exhaust gas flow passage that is between the junction 9 and the main catalytic converter 4. The sensor 10 is for detecting the air-fuel ratio of exhaust gas downstream of the junction 9 at which the bypass exhaust gas flow passage joins the main exhaust gas flow passage. Preferably, the bypass upstream air-fuel sensor 12 includes a broadband air-fuel sensor, whereas the three air-fuel ratio sensors 10, 11, 13 include oxygen sensors. Moreover, in the fourth embodiment, although the engine air-fuel ratio may be immediately changed between the rich and lean states, only the change from the lean state to the rich state will be described.

In the fourth embodiment, the diagnosis process is identical to that of the second embodiment. Further, the relevant flow chart showing the diagnosis process of this embodiment is identical to that illustrated in FIG. 4.

Figure 9:
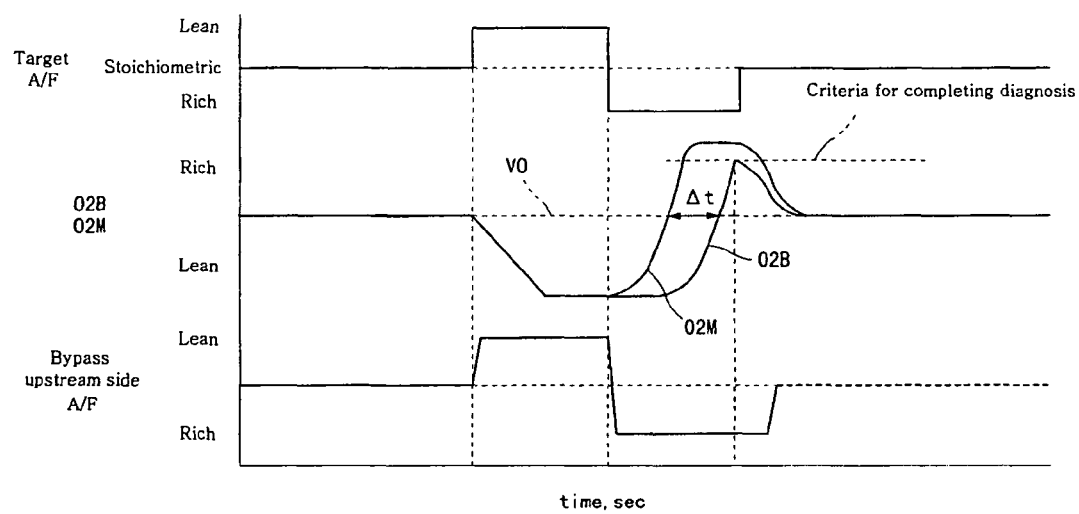
FIG. 9 is a time chart illustrating a leakage diagnosis in accordance with a fourth embodiment according to the present invention.

FIG. 9, which is a time chart illustrating the diagnosis of the fourth embodiment, shows the following: the change of the target air-fuel ratio of the internal combustion engine, the output signal O2B from the bypass downstream air-fuel ratio sensor 13 and the output signal O2M from the main upstream air-fuel ratio sensor 10, and the air-fuel ratio detected by the bypass upstream air-fuel ratio sensor 12. Further, FIG. 9 illustrates a case when leakage occurs from the flow path switching valve 5 (as will be described hereinafter). As was previously described for the purpose of diagnosing leakage, the target engine air-fuel ratio is forcibly changed to a lean state from the ideal air-fuel ratio, and is then immediately changed to a rich state. Then, since the flow path switching valve 5 is closed, the exhaust gas flows through the bypass exhaust gas passage 7 and oxygen is stored in the catalyst of the bypass catalytic converter 8 during the lean state. To this end, the output signal O2B of the bypass downstream air-fuel ratio sensor 13, which is disposed downstream of the bypass catalytic converter 8, changes to indicate a lean state after a time delay. Further, the bypass upstream air-fuel ratio sensor 12 immediately begins to indicate a lean state of the exhaust air-fuel ratio with respect to the engine air-fuel ratio. Moreover, in the fourth embodiment, the target engine air-fuel ratio is changed to the rich state with a time delay after the signal O2B from the bypass downstream air-fuel ratio sensor 13 indicates the lean state.

When the target engine air-fuel ratio is changed from the lean state to the rich state, the air-fuel ratio detected by the bypass upstream air-fuel ratio sensor 12 disposed upstream of the bypass catalytic converter 8 immediately begins to change to indicate the rich state. Since the oxygen stored in the bypass catalytic converter 8 is discharged downstream of the bypass catalytic converter 8, the output signal O2B from the bypass downstream air-fuel ratio sensor 10 reverts to indicating the rich state with a time delay after the engine air-fuel ratio turns to the rich state. Further, unless exhaust gas is leaking by the flow path switching valve 5, the output signal O2M from the main upstream air-fuel ratio sensor 10 almost simultaneously reverts to indicating the rich state. For example, if the difference between the distance from the exhaust port 2 of the engine 1 to the bypass downstream air-fuel ratio sensor 13 and the distance from the exhaust port 2 of the engine 1 to the main upstream air-fuel ratio sensor 10 is disregarded, then both of the output signals O2B, O2M simultaneously revert from indicating a rich state to indicating a lean state if no leakage occurs.

However, if exhaust gas leaks past the flow path switching valve 5, e.g., due to a sealing defect in the valve body, a portion of the exhaust gas reaches the main upstream air-fuel ratio sensor 10 without passing through the bypass catalytic converter 8. As a result, the output signal O2M from the main upstream air-fuel ratio sensor 10 reverts to indicating a rich state, as shown in FIG. 9. That is, when leakage does occur, the difference increases between the change timings to the rich state of the output signal O2M from the main upstream air-fuel ratio sensor 10 and the output signal O2B from the bypass downstream air-fuel ratio sensor 13. Further, the target air-fuel ratio returns to the ideal air-fuel ratio when the output signal O2B from the bypass downstream air-fuel ratio sensor 13 reaches a predetermined level (corresponding to the lean state) and all the oxygen stored in the catalyst is discharged.

As mentioned above, whether or not the leakage occurs can be determined based on the output signals from the main upstream air-fuel ratio sensor 10 and the bypass upstream air-fuel ratio sensor 12. Such a determination can be made after the engine air-fuel ratio is immediately changed between the lean and the rich states with respect to the ideal air-fuel ratio interposed between the lean and the rich states. More specifically, the diagnosis can be performed by using the output difference or the time difference between the changes in the output (as will be described hereinafter).

In the fourth embodiment, the level of leakage may be represented using numerical values based on determining the points of time when the output signals O2M, O2B from the main upstream air-fuel ratio sensor 10 and the bypass downstream air-fuel ratio sensor 13, respectively, revert to the rich state from the lean state across an intermediate reference voltage V0 (shown in FIG. 9). The time difference ΔT between both points of time (i.e., the time delay of the change in the output signal O2B with respect to the change in the output signal O2M) is set as a diagnostic parameter. Then, the diagnostic parameter is compared with a predetermined threshold value L for determining leakage. The threshold value L is predetermined according to the leakage level to be detected. If it is desirable for the diagnosis to detect a slight level of leakage, then the threshold value may be set lower (however, more detection errors may occur when the threshold value is low). Accordingly, when the time difference $\Delta T$ is large, it is determined that leakage has occurred.

A diagnosis based on the time difference $\Delta T$ has the following effects. Since the output of the oxygen sensor rapidly changes according to the particular condition (i.e., lean state or rich state), a large output difference may be easily detected even when no actual leakage occurs. This is because the change timings of the outputs are inconsistent with each other due to the relative positions of the sensors in the exhaust system (i.e., relatively upstream or downstream). However, as described above, the time difference $\Delta T$ provides a diagnostic parameter that appears more distinct with regard to whether or not leakage occurs. Thus, the diagnosis accuracy can be further enhanced as compared to using the output difference.

In the fourth embodiment, whether or not the flow path switching valve 5 leaks can be easily diagnosed by using the conventional air-fuel ratio sensors 10, 11, 12, 13 for feedback control of the air-fuel ratio. Therefore, without additional sensors, it is possible to avoid unnecessarily toxic exhaust gas emissions due to sealing defects or the like in the flow path switching valve 5.

Further, oxygen can be fully stored in the catalyst up to a saturated state or the catalyst can be maintained at an oxygen-empty state until the air-fuel ratio is changed from lean to rich states, and vice-versa, with respect to the ideal air-fuel ratio interposed between the lean and rich states. This may increase the accuracy of the diagnosis since it can maximize the difference between the detected air-fuel ratios. In the fourth embodiment, a proper time delay is given after the output signal from the bypass downstream air-fuel ratio sensor 13 indicates a lean state, and the engine air-fuel ratio is initially set to the lean state to increase the amount of oxygen stored in the catalyst of the bypass catalytic converter 8. As such, the catalyst can be in a fully saturated state. Further, unpurified HC is not discharged until the oxygen is saturated.

However, when the engine air-fuel ratio is initially set to a rich state, the amount of oxygen stored in the catalyst decreases. Further, the oxygen introduced into the catalyst remains stored in the catalyst after the engine air-fuel ratio is set to a lean state. Therefore, if there is no leakage, then the main upstream air-fuel ratio sensor 10 indicates a change to the lean state after a time delay. If the main upstream air-fuel ratio sensor 10 rapidly changes to the lean state, then there is leakage.

Since the above diagnosis depends on the oxygen capacity of the catalyst in the bypass catalytic converter 8 (similar to the second embodiment), such diagnosis may be influenced if the oxygen capacity is lowered due to deterioration of the catalyst. Thus, although the threshold value L may be a constant value, it may be useful to adjust the threshold value according to the level of catalyst deterioration level, and thereby increase the accuracy of the diagnosis.

The method of the second embodiment with reference to FIG. 6 may be employed as the diagnosis method for the catalyst deterioration level of the bypass catalytic converter 8.

The threshold value L can be determined, for example, based on the catalyst deterioration level. As a result, the threshold value L may reflect the catalyst deterioration level. Hence, the diagnosis of leakage can be accurately performed.

Insofar as the diagnosis of catalyst deterioration level is conducted in an open condition of the flow path switching valve 5, it is possible to accurately determine whether or not the leakage occurs in the flow path switching valve 5. This is because the valve-opened state enables the catalyst deterioration level to be measured without being influenced by any leakage. Further, whether or not the leakage occurs can be determined based on the measured catalyst deterioration level. Additionally, alternative methods may be used to diagnosis the level of catalyst deterioration.

In the fourth embodiment of the present invention, an exhaust gas purifying system includes bypass exhaust gas passage 7 provided upstream of the main exhaust gas flow passage leading to the main catalytic converter 4. The bypass exhaust gas passage 7 lead to the bypass catalytic converter 8. A flow path switching valve 5 for blocking exhaust gas flow is provided upstream of the main exhaust gas flow passage. Further, the purifying system includes a first air-fuel ratio detection means for detecting an exhaust air-fuel ratio downstream of the bypass catalytic converter 8, a second air-fuel ratio detection means for detecting an exhaust air-fuel ratio upstream of the main catalytic converter 4, an air-fuel ratio control means for changing immediately an engine air-fuel ratio between lean and rich states with respect to the ideal air-fuel ratio when the flow path switching valve 5 is in a closed condition, and a diagnostic means for diagnosing whether there is any leakage by the flow path switching valve 5 based on the air-fuel ratios detected by the first and second air-fuel ratio detection means after the immediate changes of the engine air-fuel ratio.

The immediate change of the engine air-fuel ratio is preferably from the lean state to the rich state, while maintaining a sufficient time necessary for saturating the oxygen in the bypass catalytic converter 8.

In the exhaust gas purifying system according to the fourth embodiment, when the flow path switching valve 5 is in the closed condition, preferably all of the exhaust gas from the engine 1 is introduced into the bypass exhaust gas passage 7 and passes through the bypass catalytic converter 8. However, when the flow path switching valve 5 is in the open condition, preferably most of the exhaust gas from the engine 1 avoids the bypass exhaust gas passage 7 due to the greater differential flow resistance with respect to the exhaust gas passages 3.

Diagnosing whether the flow path switching valve 5 is leaking may be performed by changing the engine air-fuel ratio, e.g., from lean state to rich state, when the flow path switching valve 5 is set to be in the closed condition. In such a case, excess oxygen during the lean state of the engine air-fuel ratio is stored in the catalyst according to the oxygen capacity of the bypass catalytic converter 8. However, oxygen is discharged when the engine air-fuel ratio is set to the rich state. Thus, although the engine air-fuel ratio is set to the rich state, the air-fuel ratio detected by the first and second air-fuel ratio detection means do not immediately indicate a rich state due to the influence of the discharging oxygen so long as the flow path switching valve 5 is not leaking. In other words, the exhaust air-fuel ratio detected by the second air-fuel ratio detection means is relatively leaner than the engine air-fuel ratio immediately after changing the engine air-fuel ratio. However, when the flow path switching valve 5 is leaking, the exhaust air-fuel ratio detected by the second air-fuel ratio detecting means can be even leaner due to the relatively rich state of the leaked exhaust gas. Therefore, leakage by the flow path switching valve and the level of such leakage may be determined by using these factors. When the engine air-fuel ratio is set from rich to lean, the leakage diagnosis may be influenced by the oxygen capacity of the bypass catalytic converter 8.

Preferably, the diagnosis of the flow path switching valve 5 is performed by changing the engine air-fuel ratio, e.g., from a lean state to a rich state, when the flow path switching valve 5 is set to be in a closed-state. In such a case, excess oxygen during the lean state of the engine air-fuel ratio is stored in the catalyst due the oxygen capacity of the bypass catalytic converter 8. However, oxygen is discharged when the engine air-fuel ratio transitions to the rich state. Thus, although the engine air-fuel ratio is changed to the rich state, the air-fuel ratios detected by the first and second air-fuel ratio detection means are not immediately turned to the rich state. This is due to the oxygen being discharged so long as the flow path switching valve 5 does not leak. If all of the oxygen stored in the catalyst has been consumed, then the air-fuel ratios detected by the first and second air-fuel detection means indicate a rich state at approximately the same time. However, when the flow path switching valve 5 is leaking, the exhaust air-fuel ratio detected by the second air-fuel ratio detecting means immediately indicates a lean state since the leaking exhaust gas is in a rich state. Therefore, whether or not the flow path switching valve 5 is leaking, and the level of such leakage, may be determined based on these factors. When the engine air-fuel ratio is turned from rich to lean, the influence of leakage may be due to the oxygen capacity.

In the fourth embodiment, determining whether or not leakage occurs is performed based on a difference between the change timings of the air-fuel ratios detected by the first and second air-fuel ratio detection means after immediately changing the engine air-fuel ratio.

The oxygen capacity may be influenced by the catalyst deterioration level. Thus, it is preferable to provide a catalyst deterioration detecting means for measuring the catalyst deterioration level. This is so that the leakage diagnosis can be corrected or adjusted for according to the catalyst deterioration level.

For example, when the leakage diagnosis is performed by comparing the threshold value with time delay of the change timing of the air-fuel ratio detected by the first air-fuel ratio detection means with respect to the change timing of the air-fuel ratio detected by the second air-fuel ratio detection means after the engine air-fuel ratio is changed immediately, the threshold value may be modified depending on the catalyst deterioration level. As such, the accuracy of the diagnosis can be increased.

According to the fourth embodiment, determining at an early stage whether the flow path switching valve 5 is leaking may avoid the discharge of unpurified exhaust gas to the atmosphere.

Moreover, adjusting the diagnosis to reflect the catalyst deterioration level may improve the accuracy of the diagnosis.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

The invention claimed is:

1. An apparatus for diagnosing an exhaust gas purification system for an internal combustion engine, the apparatus comprising:
a main exhaust gas passage;
a main catalytic converter disposed in the main exhaust gas passage;
a bypass exhaust gas passage in fluid communication with the main exhaust gas passage so as to bypass a section thereof between a branch point at which the bypass exhaust gas passage branches out of the main exhaust gas passage and a junction at which the bypass exhaust gas passage merges into the main exhaust gas passage at a upstream side of the main catalytic converter;
a bypass catalytic converter disposed in the bypass exhaust gas passage;
a valve provided in the section of the main exhaust gas passage and configured to open or close the section of the main exhaust gas passage;
a first sensor disposed in the bypass exhaust gas passage to output a first signal indicative of a first air-fuel ratio of an exhaust gas flowing in the bypass exhaust gas passage;
a second sensor disposed in the main exhaust gas passage to output a second signal indicative of a second air-fuel ratio of an exhaust as flowing into the main catalytic converter; and
a controller receiving the first and second signals, the controller determining whether the valve in the closed configuration leaks exhaust gas through the section of the main exhaust gas passage based on a comparison of the temporal responses of the first and second signals to a change in an engine air-fuel ratio supplied to the internal combustion engine;
wherein the first sensor detects the first air-fuel ratio of exhaust gas upstream of the bypass catalytic converter;
wherein the first signal indicates changes between rich and lean states of the first air-fuel ratio of exhaust gas passing through the bypass exhaust gas passage, and the second signal indicates changes between rich and lean states of the second air-fuel ratio of exhaust gas passing through the main exhaust gas passage; and
wherein the determining whether the valve in the closed configuration is leaking comprises measuring a time delay between the first signal indicating the changes between rich and lean states of the first air-fuel ratio and the second signal indicating the changes between rich and lean states of the second air-fuel ratio, the time delay being in response to periodic changes of an engine air-fuel ratio supplied to the internal combustion engine.

2. The apparatus of claim 1, the second sensor detects the second air-fuel ratio of exhaust gas downstream of the valve.

3. The apparatus of claim 1, wherein the determining whether the valve in the closed configuration is leaking comprises:
determining that a leak exists when the time delay is not greater than a threshold value; and
determining that a leak does not exist when the time delay is greater than the threshold value.

4. The apparatus of claim 1, wherein the determining whether the valve in the closed configuration is leaking comprises:
determining that a leak exists when the time delay is less than a first threshold value;
determining that a leak does not exist when the time delay is greater than a second threshold value; and
determining that the bypass catalytic converter is deteriorated when the time delay is in a predetermined range between the first and second threshold values.

5. An apparatus for diagnosing an exhaust gas purification system for an internal combustion engine, the apparatus comprising:
a main exhaust gas passage;

a main catalytic converter disposed in the main exhaust gas passage;
a bypass exhaust gas passage in fluid communication with the main exhaust gas passage so as to bypass a section thereof between a branch point at which the bypass exhaust gas passage branches out of the main exhaust gas passage and a junction at which the bypass exhaust gas passage merges into the main exhaust gas passage at a upstream side of the main catalytic converter;
a bypass catalytic converter disposed in the bypass exhaust gas passage;
a valve provided in the section of the main exhaust gas passage and configured to open or close the section of the main exhaust gas passage;
a first sensor disposed in the bypass exhaust gas passage to output a first signal indicative of a first air-fuel ratio of an exhaust gas flowing in the bypass exhaust gas passage;
a second sensor disposed in the main exhaust gas passage to output a second signal indicative of a second air-fuel ratio of an exhaust gas flowing into the main catalytic converter; and
a controller receiving the first and second signals, the controller determining whether the valve in the closed configuration leaks exhaust gas through the section of the main exhaust gas passage based on a comparison of the temporal responses of the first and second signals to a change in an engine air-fuel ratio supplied to the internal combustion engine;
wherein the first sensor detects the first air-fuel ratio of exhaust as upstream of the bypass catalytic converter;
wherein the first signal indicates changes between rich and lean states of the first air-fuel ratio of exhaust gas passing through the bypass exhaust gas passage, and the second signal indicates changes between rich and lean states of the second air-fuel ratio of exhaust gas passing through the main exhaust gas passage; and
wherein the determining whether the valve in the closed configuration is leaking comprises comparing a first interval during which the first signal stays in one of the rich and lean states of the first air-fuel ratio to a second interval during which the second signal stays in one of the rich and lean states of the second air-fuel ratio, the changes between the rich and lean states of the first and second air-fuel ratios being in response to periodic changes of an engine air-fuel ratio supplied to the internal combustion engine.

6. The apparatus of claim 5, wherein the determining whether the valve in the closed configuration is leaking comprises:
determining that a leak exists when the first interval is substantially equal to the second interval; and
determining that a leak does not exist when the first interval is less than the second interval.

7. The apparatus of claim 5, wherein the determining whether the valve in the closed configuration is leaking comprises:
determining that a leak exists when the first interval is substantially equal to the second interval;
determining that a leak does not exist when a difference between the first and second intervals is greater than a threshold value; and
determining that the bypass catalytic converter is deteriorated when the difference between the first and second intervals is not greater than the threshold value.

8. An apparatus for diagnosing an exhaust gas purification system for an internal combustion engine, the apparatus comprising:
a main exhaust gas passage;
a main catalytic converter disposed in the main exhaust gas passage;
a bypass exhaust gas passage in fluid communication with the main exhaust gas passage so as to bypass a section thereof between a branch point at which the bypass exhaust gas passage branches out of the main exhaust gas passage and a junction at which the bypass exhaust gas passage merges into the main exhaust gas passage at a upstream side of the main catalytic converter;
a bypass catalytic converter disposed in the bypass exhaust gas passage;
a valve provided in the section of the main exhaust gas passage and configured to open or close the section of the main exhaust gas passage;
a first sensor disposed in the bypass exhaust gas passage to output a first signal indicative of a first air-fuel ratio of an exhaust gas flowing in the bypass exhaust gas passage;
a second sensor disposed in the main exhaust gas passage to output a second signal indicative of a second air-fuel ratio of an exhaust gas flowing into the main catalytic converter; and
a controller receiving the first and second signals, the controller determining whether the valve in the closed configuration leaks exhaust gas through the section of the main exhaust gas passage based on a comparison of a temporal responses of the first and second signals to a change in an engine air-fuel ratio supplied to the internal combustion engine;
wherein the first sensor detects the first air-fuel ratio of exhaust gas upstream of the bypass catalytic converter; and
wherein the controller carries out an immediate change of an engine air-fuel ratio from one of a lean state and a rich state to the other of a lean state and a rich state, the first signal and the second signal being respectively indicative of the first air-fuel ratio and the second air-fuel ratio after and in response to the immediate change;
wherein the temporal responses of the first and second signals are responses to the immediate change in which, while the engine air-fuel ratio is maintained in the other of the lean state and the rich state, both the first and second signal trend monotonically toward the same state as the engine air-fuel ratio.

9. The apparatus of claim 8, wherein the first signal indicates an average state of the first air-fuel ratio detected by the first sensor, the second signal indicates an average state of the second air-fuel ratio detected by the second sensor, and the average states of the first and second air-fuel ratios are determined during a predetermined period after changing the engine air-fuel ratio.

10. The apparatus of claim 8, wherein the second sensor detects the second air-fuel ratio of exhaust gas downstream of the bypass exhaust gas passage.

11. The apparatus of claim 8, wherein the immediate change the engine air-fuel ratio is from the lean state to the rich state.

12. The apparatus of claim 11, wherein the immediate change of the engine air-fuel ratio occurs after a sufficient period for approximating oxygen saturation in the bypass catalytic converter.

13. An apparatus for diagnosing an exhaust gas purification system for an internal combustion engine, the apparatus comprising:
a main exhaust gas passage;
a main catalytic converter disposed in the main exhaust gas passage;

a bypass exhaust gas passage in fluid communication with the main exhaust gas passage so as to bypass a section thereof between a branch point at which the bypass exhaust gas passage branches out of the main exhaust gas passage and a junction at which the bypass exhaust gas passage merges into the main exhaust gas passage at a upstream side of the main catalytic converter;

a bypass catalytic converter disposed in the bypass exhaust gas passage;

a valve provided in the section of the main exhaust gas passage and configured to open or close the section of the main exhaust gas passage;

a first sensor disposed in the bypass exhaust gas passage to output a first signal indicative of a first air-fuel ratio of an exhaust gas flowing in the bypass exhaust gas passage;

a second sensor disposed in the main exhaust gas passage to output a second signal indicative of a second air-fuel ratio of an exhaust gas flowing into the main catalytic converter; and a controller receiving the first and second signals, the controller determining whether the valve in the closed configuration leaks exhaust gas through the section of the main exhaust gas passage based on the first and second signals;

wherein the first sensor detects the first air-fuel ratio of exhaust gas upstream of the bypass catalytic converter;

wherein the controller carries out an immediate change of an engine air-fuel ratio between lean and rich states, the first signal and the second signal are respectively indicative of the first air-fuel ratio and the second air-fuel ratio after and in response to the immediate change; and wherein the controller determines a catalyst deterioration level of the bypass catalytic converter, and wherein the controller adjusts the determining whether the valve in the closed configuration is leaking based on the catalyst deterioration level of the bypass catalytic converter.

14. The apparatus of claim 13, further comprising:

a third sensor disposed in the bypass exhaust gas passage, the third sensor detecting a third air-fuel ratio of exhaust gas downstream of the bypass catalytic convener, and the third sensor outputting a third signal indicative of the third air-fuel ratio, the controller receiving the third signal and determining the catalyst deterioration level based on changes in the first and third air-fuel ratios in response to the engine air-fuel ratio being changed when the valve is in the opened configuration.

15. The apparatus of claim 13, wherein the first signal indicates an average state of the first air-fuel ratio detected by the first sensor, the second signal indicates an average state of the second air-fuel ratio detected by the second sensor, and the average states of the first and second air-fuel ratios are determined during a predetermined period of changing the engine air-fuel ratio, the determining whether the valve in the closed configuration is leaking comprises comparing a threshold value with a difference between the first and second signals indicating the average air-fuel ratios, and the threshold value being modified based on a catalyst deterioration level of the bypass catalytic converter.

16. An apparatus for diagnosing an exhaust gas purification system for an internal combustion engine, the apparatus comprising:

a main exhaust gas passage;

a main catalytic converter disposed in the main exhaust gas passage;

a bypass exhaust gas passage in fluid communication with the main exhaust gas passage so as to bypass a section thereof between a branch point at which the bypass exhaust gas passage branches out of the main exhaust gas passage and a junction at which the bypass exhaust gas passage merges into the main exhaust gas passage at a upstream side of the main catalytic converter;

a bypass catalytic converter disposed in the bypass exhaust gas passage;

a valve provided in the section of the main exhaust gas passage and configured to open or close the section of the main exhaust gas passage;

a first sensor disposed in the bypass exhaust gas passage to output a first signal indicative of a first air-fuel ratio of an exhaust gas flowing in the bypass exhaust gas passage;

a second sensor disposed in the main exhaust gas passage to output a second signal indicative of a second air-fuel ratio of an exhaust gas flowing into the main catalytic converter; and a controller receiving the first and second signals, the controller determining whether the valve in the closed configuration leaks exhaust gas through the section of the main exhaust gas passage based on a comparison of a temporal responses of the first and second signals to a change in an engine air-fuel ratio supplied to the internal combustion engine;

wherein the first sensor detects the first air-fuel ratio of exhaust gas downstream of the bypass catalytic converter, and the second sensor detects the second air-fuel ratio of exhaust gas downstream of the bypass exhaust gas passage;

wherein the controller carries out an immediate change of an engine air-fuel ratio from one of a lean state and a rich state to the other of a lean state and a rich state, the first signal and the second signal are respectively indicative of the first air-fuel ratio and the second air-fuel ratio after the immediate change; and wherein the temporal responses of the first and second signals are responses to the immediate change in which, while the engine air-fuel ratio is maintained in the other of the lean state and the rich state, both the first and second signal trend monotonically toward the same state as the engine air-fuel ratio.

17. The apparatus of claim 16, wherein the determining whether the valve in the closed configuration is leaking comprises determining whether a time difference occurs between when the first signal indicates a change between rich and lean states of the first air-fuel ratio and when the second signal indicates a change between rich and lean states of the second air-fuel ratio, the time difference being in response to the engine air-fuel ratio being changed.

18. The apparatus of claim 16, wherein the immediate change the engine air-fuel ratio is from the lean state to the rich state.

19. The apparatus of claim 18, wherein the immediate change of the engine air-fuel ratio occurs after a sufficient period for approximating oxygen saturation in the bypass catalytic converter.

20. An apparatus for diagnosing an exhaust gas purification system for an internal combustion engine, the apparatus comprising:

a main exhaust gas passage;

a main catalytic converter disposed in the main exhaust gas passage;

a bypass exhaust gas passage in fluid communication with the main exhaust gas passage so as to bypass a section thereof between a branch point at which the bypass exhaust gas passage branches out of the main exhaust gas passage and a junction at which the bypass exhaust gas passage merges into the main exhaust gas passage at a upstream side of the main catalytic converter;

a bypass catalytic converter disposed in the bypass exhaust gas passage;

a valve provided in the section of the main exhaust gas passage and configured to open or close the section of the main exhaust gas passage;

a first sensor disposed in the bypass exhaust gas passage to output a first signal indicative of a first air-fuel ratio of an exhaust gas flowing in the bypass exhaust gas passage;

a second sensor disposed in the main exhaust gas passage to output a second signal indicative of a second air-fuel ratio of an exhaust gas flowing into the main catalytic converter; and a controller receiving the first and second signals, the controller determining, whether the valve in the closed configuration leaks exhaust gas through the section of the main exhaust gas passage based on the first and second signals;

wherein the first sensor detects the first air-fuel ratio of exhaust gas downstream of the bypass catalytic converter, and the second sensor detects the second air-fuel ratio of exhaust gas downstream of the bypass exhaust gas passage;

wherein the controller carries out an immediate change of an engine air-fuel ratio between lean and rich states, the first signal and the second signal are respectively indicative of the first air-fuel ratio and the second air-fuel ratio after the immediate change; and wherein the controller determines a catalyst deterioration level of the bypass catalytic converter, and wherein the controller adjusts the determining whether the valve in the closed configuration is leaking based on the catalyst deterioration level of the bypass catalytic converter.

21. The apparatus of claim 20, further comprising:

a third sensor disposed in the bypass exhaust gas passage, the third sensor detecting a third air-fuel ratio of exhaust gas upstream of the bypass catalytic converter, and the third sensor outputting a third signal indicative of the third air-fuel ratio, the controller receiving the third signal and determining the catalyst deterioration level based on changes in the first and third air-fuel ratios in response to the engine air-fuel ratio being changed when the valve is in the opened configuration.

22. The apparatus of claim 20, wherein the determining whether the valve in the closed configuration is leaking comprises: determining whether a time difference occurs between when the first signal indicates a change between rich and lean states of the first air-fuel ratio and when the second signal indicates a change between rich and lean states of the second air-fuel ratio, the time difference being in response to the engine air-fuel ratio being changed; comparing a threshold value with the time difference; and modifying the threshold value based on the catalyst deterioration level of the bypass catalytic converter.

* * * * *